(12) United States Patent
Koskan et al.

(10) Patent No.: US 12,014,305 B2
(45) Date of Patent: Jun. 18, 2024

(54) TENDENCY DETECTING AND ANALYSIS IN SUPPORT OF GENERATING ONE OR MORE WORKFLOWS VIA USER INTERFACE INTERACTIONS

(71) Applicant: MOTOROLA SOLUTIONS, INC., Chicago, IL (US)

(72) Inventors: Patrick D Koskan, Jupiter, FL (US); Pietro Russo, Melrose, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 145 days.

(21) Appl. No.: 17/659,338

(22) Filed: Apr. 15, 2022

(65) Prior Publication Data
US 2023/0334400 A1    Oct. 19, 2023

(51) Int. Cl.
*G06Q 10/06*    (2023.01)
*G06Q 10/0633*   (2023.01)

(52) U.S. Cl.
CPC ................. *G06Q 10/0633* (2013.01)

(58) Field of Classification Search
CPC ........................................................ G06Q 10/06
See application file for complete search history.

(56) References Cited

U.S. PATENT DOCUMENTS

| | | | | |
|---|---|---|---|---|
| 2015/0294422 | A1* | 10/2015 | Carver | G06Q 40/08 705/4 |
| 2018/0374178 | A1 | 12/2018 | Selzer | |
| 2020/0334762 | A1* | 10/2020 | Carver | G06Q 40/08 |
| 2021/0044611 | A1* | 2/2021 | Norrie | H04L 63/083 |
| 2021/0112101 | A1* | 4/2021 | Crabtree | H04L 63/1425 |
| 2021/0216928 | A1* | 7/2021 | O'Toole | G06F 16/287 |
| 2022/0020040 | A1* | 1/2022 | Valacich | G06Q 30/02 |
| 2022/0068161 | A1* | 3/2022 | Pifko | G07C 5/085 |

FOREIGN PATENT DOCUMENTS

| | | | | |
|---|---|---|---|---|
| CN | 111489056 A | | 8/2020 | |
| WO | WO-2020106586 A1 | * | 5/2020 | ........ G06F 11/3438 |

OTHER PUBLICATIONS

S. Aggarwal, T. Sinha, Y. Kukreti, S. Shikhar, Media bias detection and bias short term impact assessment, Array (2020). (Year: 2020).*
Eri O'Diah: "Application—Solution Overview + Alignment ", downloaded from the internet: https://solve.mit.edu/challenges/unbundle-policing-accelerator/solutions/54063, Apr. 13, 2022, all pages.
Maria Clara Arango; Andrew Hogue; Karyne Williams—"An Analysis and Visualization of Best Practices for Police Data Transparency", 2021 Systems and Information Engineering Design Symposium (SIEDS), 2021, Conference Paper, Publisher: IEEE, all pages.
O'Connell, Katie, Yeji Lee, Firaz Peer, Shawn M Staudaher, Alex Godwin, Mackenzie Madden, Ellen Zegura—"Making Public Safety Data Accessible in the Westside Atlanta Data Dashboard", ARXIV ID: 1609.09756, Sep. 30, 2016, all pages.

* cited by examiner

Primary Examiner — Kurtis Gills

(57) ABSTRACT

Tendency detecting and analysis in support of generating one or more workflows via user interface interactions is disclosed. In accordance with the user interface interactions, processing user selection of one or more icons may generate at least one user-selectable option within a graphical user interface, where the user-selectable option corresponds to at least one workflow action. The workflow action may relate to an identified tendency of a person or a group of people.

17 Claims, 5 Drawing Sheets

US 12,014,305 B2

TENDENCY DETECTING AND ANALYSIS IN SUPPORT OF GENERATING ONE OR MORE WORKFLOWS VIA USER INTERFACE INTERACTIONS

BACKGROUND

Police forces and many other institutions are turning to bias training, in one form or another, to help their staff recognize when they are relying upon unfair assumptions and stereotypes. Much of the efforts thus far appear to be focused on the reactive side of the equation (e.g. responding to a complaint by an individual alleging to have been negatively treated in connection with the unfair assumptions and stereotypes). Some effort is also being put into statistical studies such as, for example, the publication entitled "An Analysis and Visualization of Best Practices for Police Data Transparency", authored by Arango et al.

In reviewing complaints against officers and employees (or volunteers) of other types of institutions, an investigator can review evidence collected in connection with the incident to which the complaint relates. Where these incidents are monitored by audio and video analytic tools, the collected evidence can include, amongst other things, recorded video along with respective video metadata, and recorded audio along with respective audio metadata.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
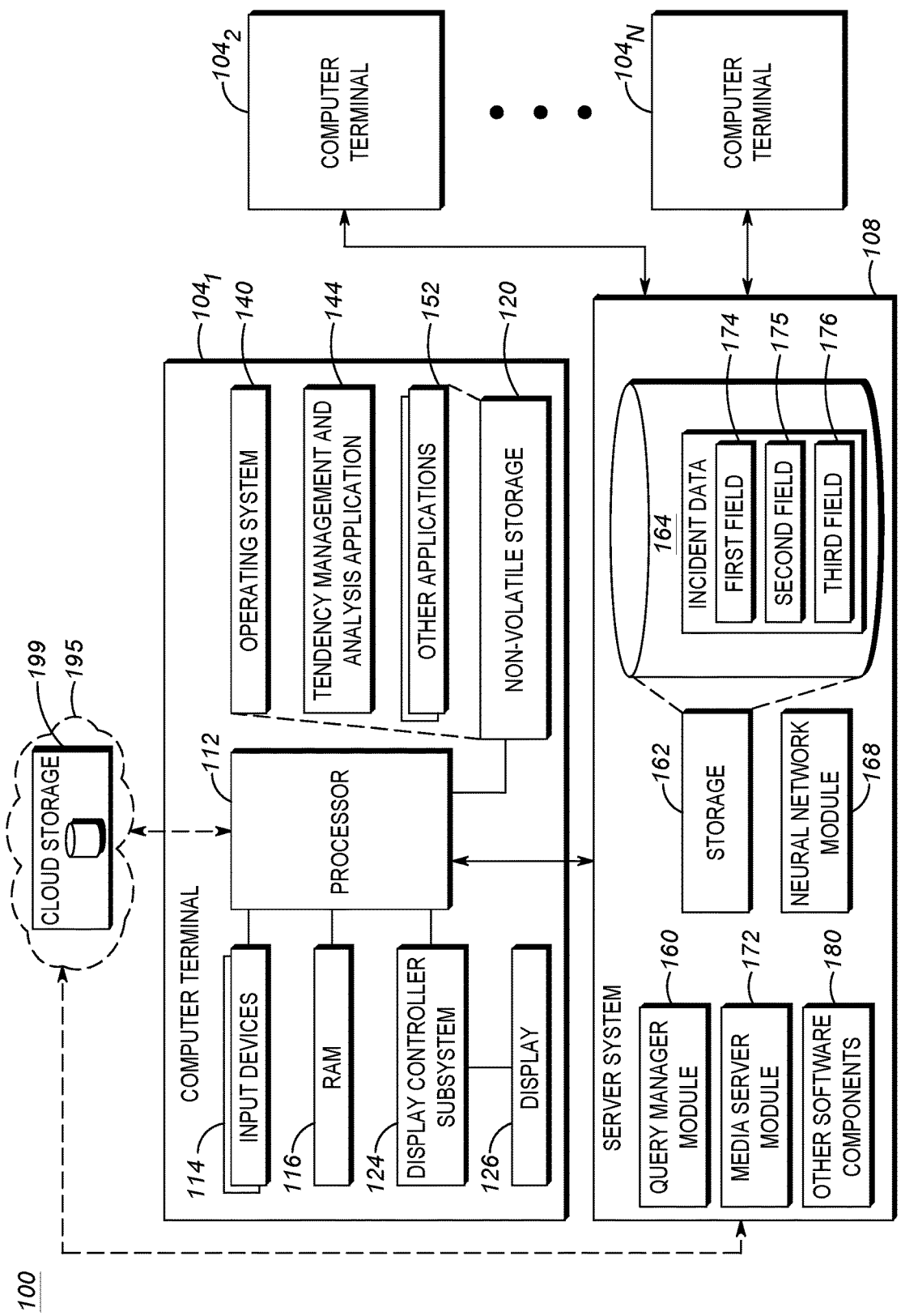
FIG. 1 is a block diagram of a computer system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method that includes establishing an incident database that includes a plurality of fields. The plurality of fields include at least one first field corresponding to a rights-protected person class, at least one second field corresponding to an individual person identification or a people group identification, and at least one third field corresponding to additional data. The computer-implemented method also includes obtaining incident data from the incident database. The incident data includes data from the first field, the second field and the third field of the plurality of fields. The computer-implemented method also includes providing the incident data to an at least one electronic processor to generate a plurality of tendency scores, calculated at least from operand data corresponding to the first field and the third field, for a respective plurality of items of the second field. First and second groups of the generated tendency scores are calculated to fall within first and second score ranges respectively. A tendency threshold falls between end boundaries of the first and second score ranges. The computer-implemented method also includes displaying a plurality of selectable icons within a graphical user interface. Each of the selectable icons corresponds to a respective one of a number of the items of the second field, and each of the selectable icons includes an indication as to whether a tendency score for the respective item of the second field is within the first score range or alternatively is within the second score range. The computer-implemented method also includes receiving input corresponding to a user having selected a first selectable icon of the plurality of selectable icons and, in response to the received input, dynamically generating at least one user-selectable option within the graphical user interface corresponding to at least one workflow action impacting a person or group of people corresponding to the first selectable icon. The at least one workflow action is related to an identified tendency of the impacted person or group of people.

In accordance with another example embodiment, there is provided a computer system that includes a computer-readable medium having an incident database that includes a plurality of fields. The plurality of fields include at least one first field corresponding to a rights-protected person class, at least one second field corresponding to an individual person identification or a people group identification, and at least one third field corresponding to additional data. The computer system also includes an at least one electronic processor communicatively coupled to the computer-readable medium. The at least one electronic processor is configured to receive incident data including data from the first field, the second field and the third field of the plurality of fields. The at least one electronic processor is also configured to generate a plurality of tendency scores, calculated at least from operand data corresponding to the first field and the third field, for a respective plurality of items of the second field. First and second groups of the generated tendency scores are calculated to fall within first and second score ranges respectively. A tendency threshold falls between end boundaries of the first and second score ranges. The computer system also includes a computer terminal configured to display a plurality of selectable icons within a graphical user interface provided on a display screen of the computer terminal. Each of the selectable icons: i) corresponds to a respective one of a number of the items of the second field, and ii) includes an indication as to whether a tendency score for the respective item of the second field is within the first score range or alternatively is within the second score range. The computer terminal is also configured to receive input corresponding to a user having selected a first selectable icon of the plurality of selectable icons and, in response to the received input, dynamically generate at least one user-selectable option within the graphical user interface corresponding to at least one workflow action impacting a person or group of people corresponding to the first selectable icon. The at least one workflow action is related to an identified tendency of the impacted person or group of people.

Each of the above-mentioned embodiments will be discussed in more detail below, starting with example system and device architectures of the system in which the embodiments may be practiced, followed by an illustration of processing blocks for achieving an improved technical method, device, and system for tendency detecting and analysis in support of generating one or more workflows.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "tendency" as used herein is understood to include any of a variety of possible tendencies associated with human behavior such as, for example, bias-driven tendency, cost-avoidance tendency, human relationship-driven tendency, etc.

Further advantages and features consistent with this disclosure will be set forth in the following detailed description, with reference to the figures.

Referring now to the drawings, and in particular FIG. 1 which is a block diagram of an example computer system 100 within which methods in accordance with example embodiments can be carried out. Included within the illustrated computer system 100 are one or more computer terminals $104_1$-$104_N$ (hereinafter interchangeably referred to as "computer terminals $104_1$-$104_N$" when referring to all of the illustrated computer terminals, or "computer terminal 104" when referring to any individual one of the plurality) and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, scanner, touch pad, roller ball and voice control means, for example), random access memory (RAM) 116, non-volatile storage 120, display controller subsystem 124 and other subsystems. The display controller subsystem 124 interacts with display screen 126 and it renders graphics and/or text upon the display screen 126.

Still with reference to the computer terminal 104 of the computer system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140 (that includes computer program instructions), tendency management and analysis application 144 (that also includes computer program instructions), and other applications 152 (each of which also includes computer program instructions), or parts thereof, may be temporarily loaded into a volatile store such as the RAM 116. The processor 112, in addition to its operating system functions, can enable execution of the various software applications on the computer terminal 104.

With reference still to FIG. 1, the server system 108 of the computer system 100 includes a query manager module 160 (this provides any of the computer terminals $104_1$-$104_N$ an interface for retrieving information from the database 164), at least one neural network module 168 (this provides artificial intelligence (such as, for example, convolutional neural networks or other learning machines) associated with one or more of anomaly detecting in relation to incidents, bias score generation, etcetera), a media server module 172 to control streaming of audio and video data (in any suitable manner as will be readily understood by those skilled in the art).

Regarding the database 164 mentioned above, it is provided in at least one storage 162. In the illustrated example embodiment, the database 164 stores incident data which includes: i) at least one first field 174 (corresponding to a right-protected person class); ii) at least one second field 175 (corresponding to an individual person identification or a people group identification); and iii) at least one third field 176 (what the third field corresponds to will vary, and examples include incident type, incident location, category of vehicle in respect of a traffic stop, number of officer complaints for a particular rights-protected person class, alleged basis for vehicle stop, and data concerning stops or searches where some perquisite legal basis may be questionable or lacking). Regarding this last data concerning stops and searches, in some examples such data may be generated at least in part from artificial intelligent processing of video and audio analytics metadata (see, for instance, co-owned U.S. patent application Ser. No. 17/651,470 filed Feb. 17, 2022).

The database 164 may also optionally store other data such as, for example, incident audio metadata, incident video metadata, etcetera. Those skilled in the art will understand that the database 164 need not necessarily be located within the server system 108. Instead it may be found within, for example, optional cloud entity 195 (i.e. cloud storage 199). Also, it will be understood that other parts herein described (such as, for instance, certain stored data, the tendency management and analysis application 144, other applications, etcetera) may analogously be provided within the cloud entity 195 as an alternative to some non-cloud portion of the computer system 100 that has been herein described.

Still with reference to FIG. 1, the server system 108 also includes other software components 180. These other software components will vary depending on the requirements of the server system 108 within the overall system. As just one example, the other software components 180 might include special test and debugging software, or software to facilitate version updating of modules within the server system 108.

Figure 2:
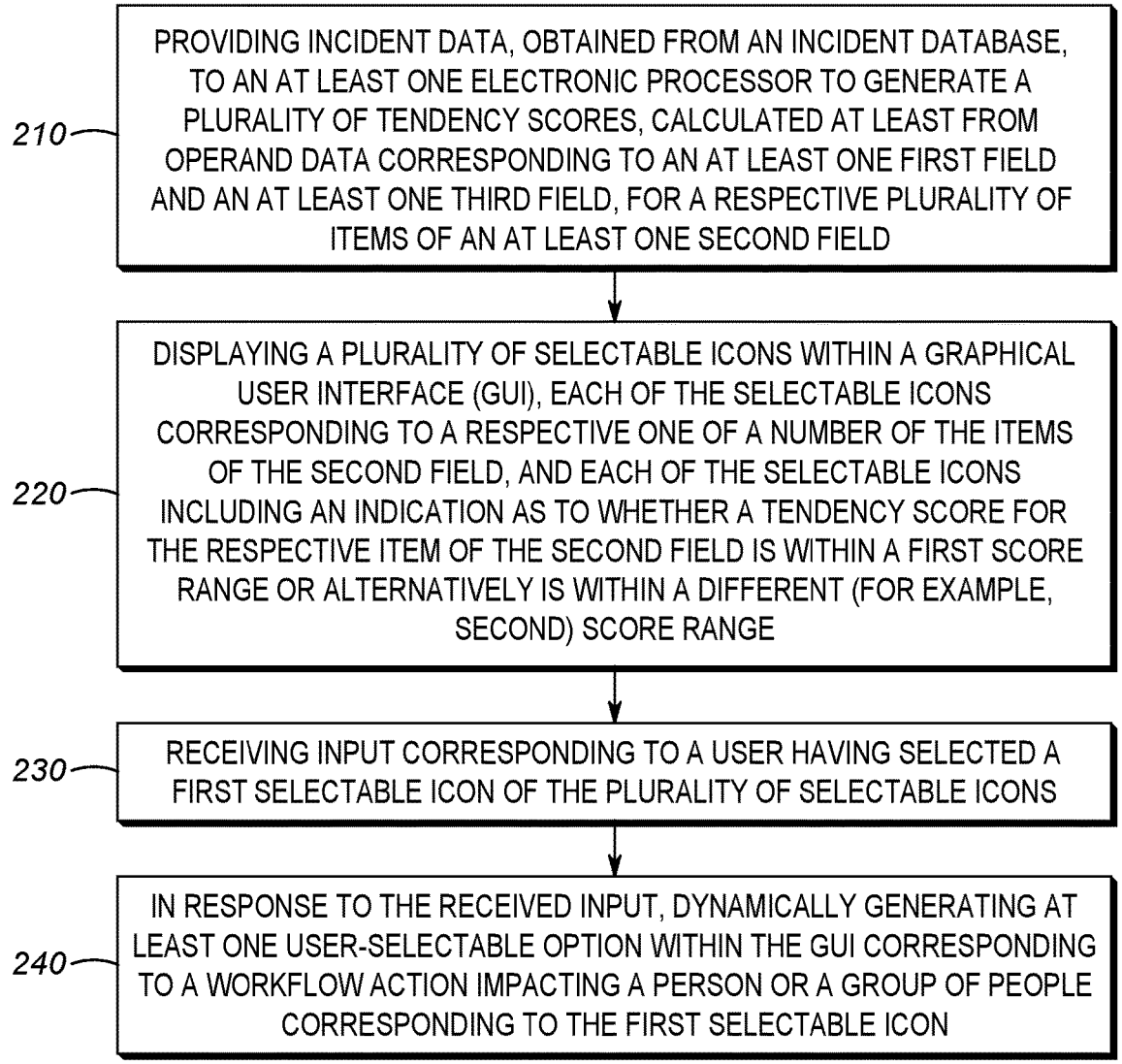
FIG. 2 is a flow chart illustrating a computer-implemented method in accordance with an example embodiment.

Reference is now made to FIG. 2. FIG. 2 is a flow chart illustrating a computer-implemented method 200 in accordance with an example embodiment. Firstly, in the method 200, incident data (obtained from an incident database such as, for example, the database 164 of FIG. 1) is provided (210) to an at least one electronic processor (for example, the processor 112, or some other processor such as, for instance, some processor within the server system 108 or the cloud entity 195) to generate a plurality of tendency scores, calculated at least from operand data corresponding to the at least one first field 174 of the database 164 and the at least one third field 176 of the database 164, for a respective plurality of items of the at least one second field 175 of the database 164.

Next in the method 200, a plurality of selectable icons are displayed (220) within a graphical user interface. Each of these selectable icons correspond to a respective one of a number of the items of the second field 175 (FIG. 1). Also, each of the selectable icons includes an indication as to whether a tendency score for the respective item of the second field 175 is within a first score range or alternatively is within one or more other score ranges (for example, second score range, third score range, etcetera, and where some tendency threshold can exist between adjacent edge boundaries of the score ranges). Different forms of the tendency score indication are contemplated such as, for example: i) one particular color of a plurality of different colors (for instance, green for a tendency score in a first range, yellow for a score in a second range, orange for a tendency score in a third range, etcetera); ii) one particular displayed shape of a plurality of different shapes (for instance, check mark shape for a tendency score in a first range, triangle shape for a score in a second range, letter "X" shape for a tendency score in a third range, etcetera).

Examples of such selectable icons and respective indications mentioned above are shown in FIGS. 3 to 5 and also described later herein (i.e. later herein a plurality of option reveal icons $320_1$ to $320_{11}$ and a plurality of tendency indicator icons $324_1$ to $324_{11}$ are described).

Next in the method 200, input that corresponds to a user having selected a first selectable icon of the plurality of selectable icons is received (230). (As mentioned previously in relation to FIG. 1, the computer terminal 104 includes the input devices 114 that can be operated by the user to provide input.)

Lastly, and in response to the received input, the method 200 includes dynamically generating (240) at least one user-selectable option within the graphical user interface corresponding to at least one workflow action impacting a person or group of people corresponding to the first selectable icon. (The "impacted" person or "impacted" group of people being impacted will vary amongst different example implementations. For instance, in one example, a public safety officer or group of public safety officers may be impacted, and in another example a prison guard or a group of prison guard may be impacted. Other examples of public-interfacing, work and volunteer positions/teams are contemplated such as, for instance, bus drivers, ride sharing workers, taxi drivers, etcetera.)

Figure 3:
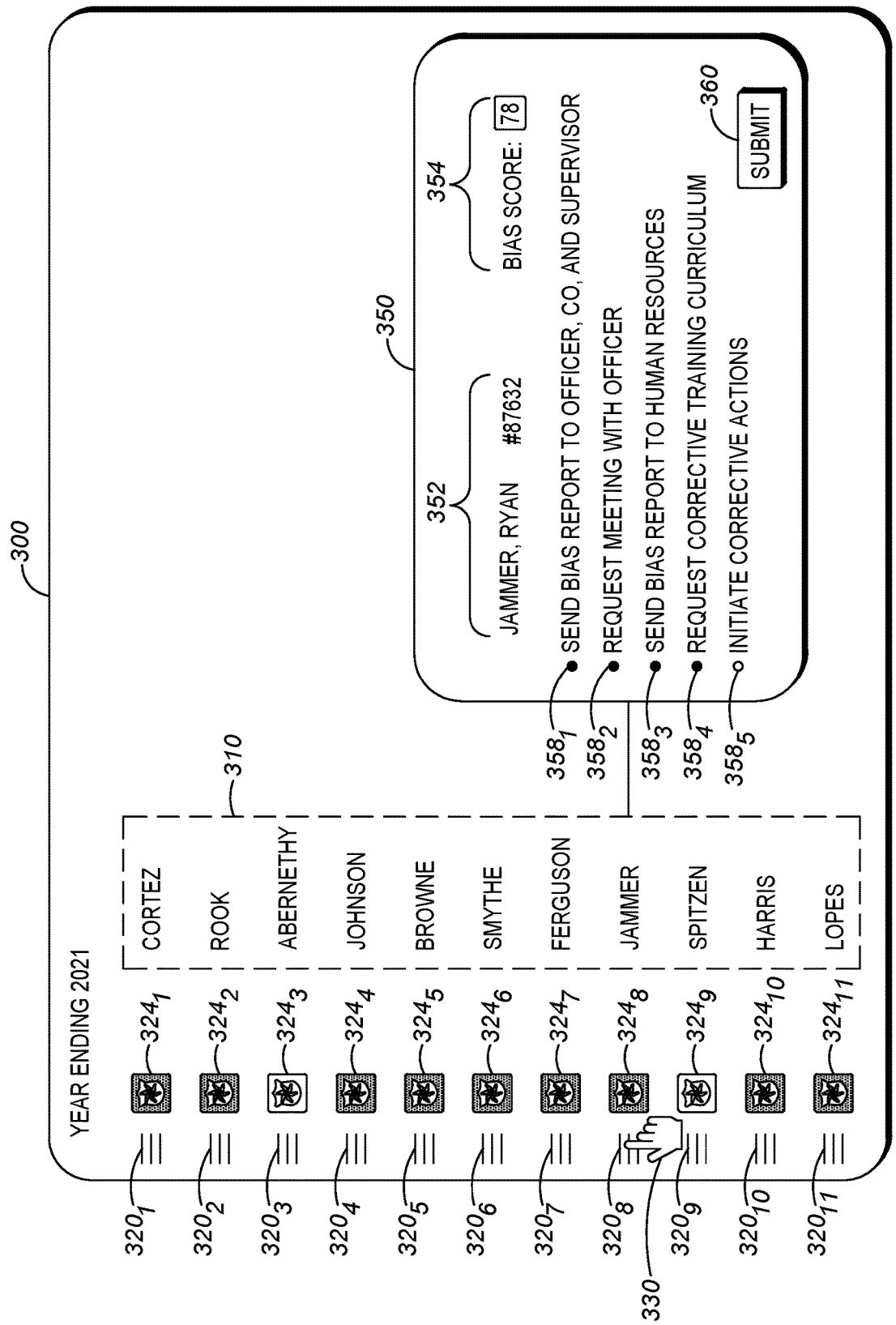
FIG. 3 illustrates an example user interface page for a tendency management and analysis application in accordance with an example embodiment.
Figure 4:
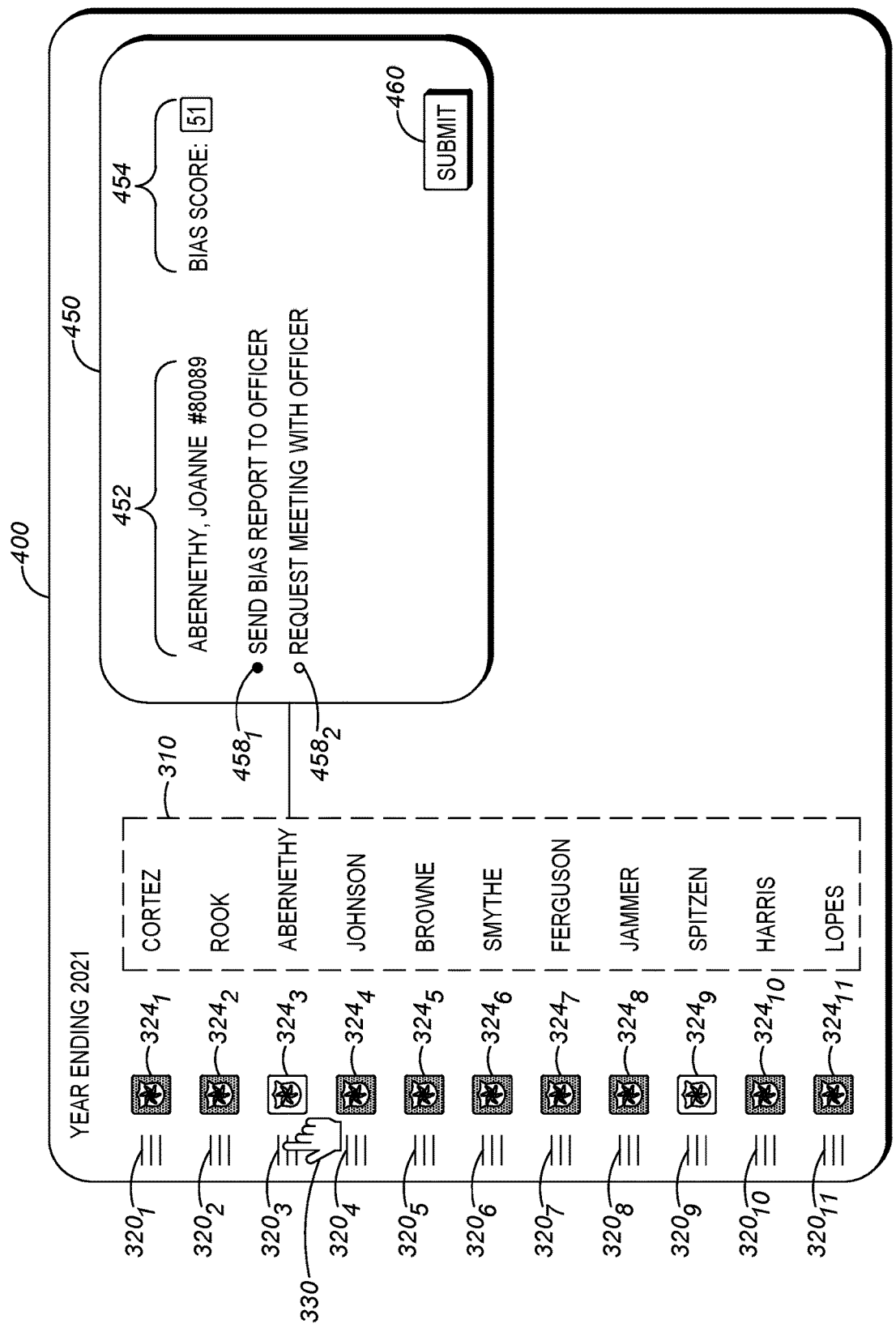
FIG. 4 illustrates another example user interface page for a tendency management and analysis application in accordance with an example embodiment.
Figure 5:
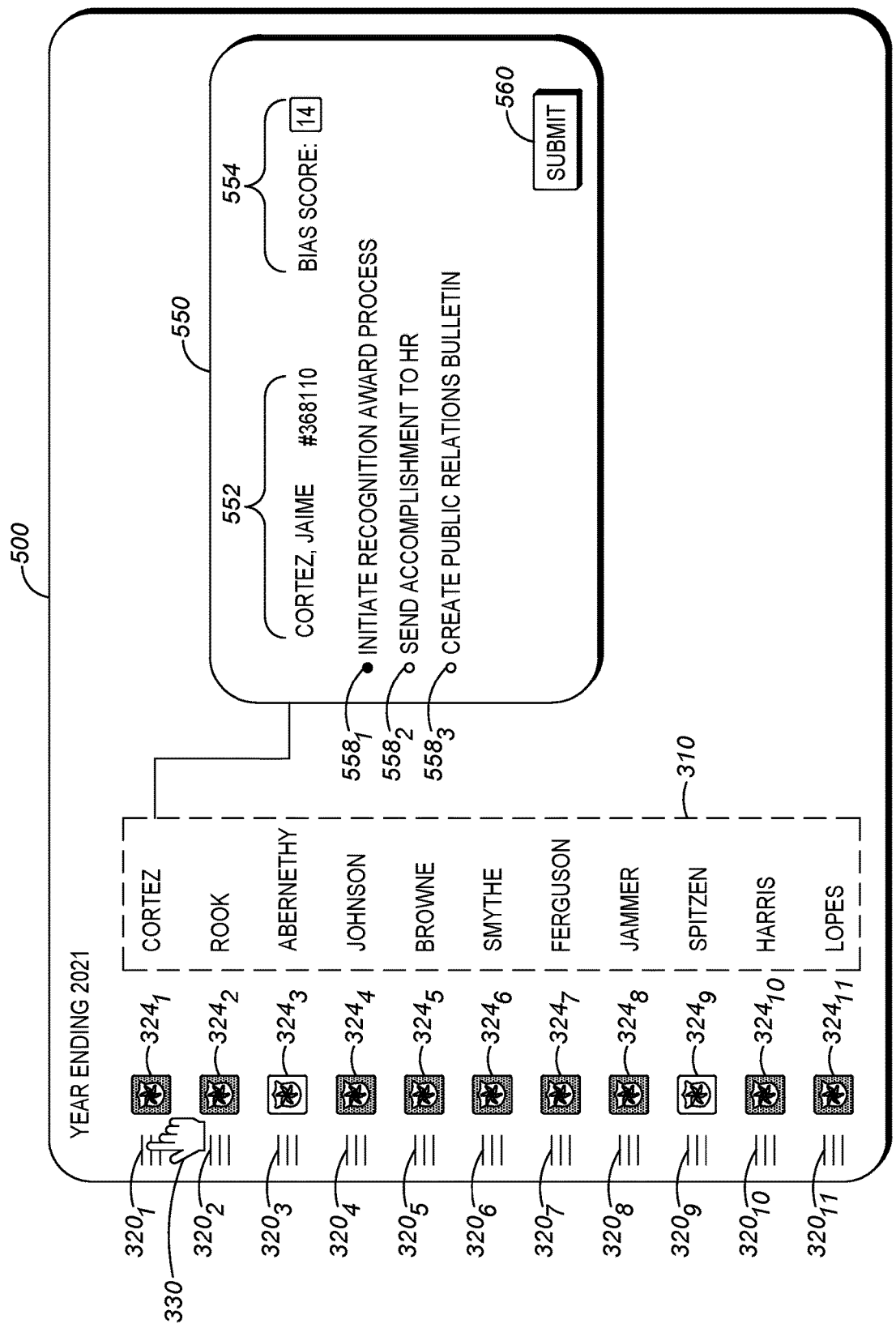
FIG. 5 illustrates yet another example user interface page for a tendency management and analysis application in accordance with an example embodiment.

Continuing on, specific examples of such user-selectable options with corresponding workflow action are shown in FIGS. 3 to 5 and also described later herein (i.e. selectable options $358_1$ to $358_5$, selectable options $458_1$ and $458_2$, and selectable options $558_1$ to $558_3$).

Starting with FIG. 3, there is illustrated an example user interface page 300 for an application (such as, for example, the tendency management and analysis application 144 of FIG. 1) in accordance with an example embodiment. A plurality of last names are arranged in a column 310 within the user interface page 300. (It will be understood that the particular formatting arrangement of icons and text within user interface pages will vary. As just one example, rather than the column 310, in one alternative example the last names might be arranged in a row or in some other suitable manner.)

In the illustrated example "Jammer" and other people whose names are displayed within the user interface page 300 are public safety officers; however it will be understood that example embodiments are not limited to those working in government funded employment and volunteer positions. For instance, the impacted person or group of people in one or more alternative example embodiments may be a private enterprise employee that interacts directly with customers, or a group of private enterprise employees that interact directly with customers.

Still with reference to the user interface page 300, the illustrated option reveal icons $320_1$ to $320ii$ are each adjacent a respective one of the tendency indicator icons $324_1$ to $324_{11}$. Furthermore, each of the tendency indicator icons $324_1$ to $324_{11}$ is adjacent a respective one of plurality of last names found in the column 310.

As shown in the illustrated example, a user operates an input device (such as, for example, one of the input devices 114 shown in FIG. 1) to move selector icon 330 over the option reveal icon $320_8$. The user then clicks on the option reveal icon $320_8$ to affect the display of options window 350. Included within the options window 350 are additional person identification details 352 for the person having the last name "Jammer" and determined bias score 354 ("bias" being one example amongst various examples of types of tendencies associated with the behavior of human beings). Also included within the options window 350 are selectable options $358_1$ to $358_5$, each corresponding to a respective workflow action that might be appropriate in relation to an identified tendency of "Jammer".

In the illustrated example, the selectable options $358_1$ to $358_5$ are just a subset of the full set of all potential selectable options (this will become more evident when FIGS. 4 and 5 are later herein discussed). The bias score (more generally, the tendency score) at a present moment in time may trigger predefined filter settings as to which of all potential selectable options are presented to the user. Alternatively, how the filtering of potential selectable options happens may have a more complex implementation. For example, hitting a high bias score for a single month might trigger presentation and/or recommendation of only a smaller subset of the subset of corrective workflow actions and, by contrast, hitting a high bias score for a certain number of consecutive months might trigger presentation and/or recommendation of more or all of the subset of corrective workflow actions. Use of artificial intelligence and machine learning to facilitate dynamic filtering of potential selectable options is contemplated; however this is not mandatory. For instance, in at least one alternative example, a more manual approach to selection of options may be permitted, such as having the user interface configured to allow the user to choose any of the potential selectable options irrespective of bias score.

Continuing on in the discussion with respect to the illustrated options window 350, there is shown five selectable options (i.e. the selectable options $358_1$ to $358_5$); however in respect of options windows herein described any suitable number of selectable options are contemplated. With respect to the selectable options $358_1$ to $358_4$, these are selected (i.e. filled circle bullet). By contract, the selectable option $358_5$ is not selected (i.e. open circle bullet). Options $358_1$ and $358_3$ are "bias report"-related. In some examples, bias reports (or, more generally, tendency reports) provide information obtained or derived from the at least one first field 174 (which, as mentioned before, corresponds to some rights-protected person class such as, for instance, race, color, gender, religion, etcetera). In one particular example, the bias report might statistically detail how "Jammer" is stopping cars owned by one particular category of race more than would be statistically expected. This would help to understand why "Jammer" has a high bias score of "78". Additional parts of the report might also highlight other factors contributing to the high bias score such as, for example, statistically high frequency of a particular type or category being recorded as a basis for why a vehicle was pulled over. As will be appreciated by those skilled in the art, various suitable ways are known to exist for calculating statistical anomalies (for example, calculating standard deviation can be used to assess how far recorded values are from one or more expected values). Also, in connection with report generation (but also more broadly for other accessing of data that may be sensitive) it is contemplated that one or more computer-implemented privacy policies may protect sensitive data that is stored (for instance, stored in the database 164). For example, personal/individual-specific data (including personally sensitive data in respect of the second field 175) may be protected by a computer-implemented privacy policy. In this manner, non-legitimate and/or non-policy-compliant uses of the tendency management and analysis application 144 may be minimized. Furthermore, it is contemplated that personally sensitive data may, in some examples, be controlled within the computer system 100 such that the personally sensitive data is not directly accessible to at least some users of the tendency management and analysis application 144.

Once the user has completed the selecting (and/or the unselecting) of the selectable options $358_1$ to $358_5$, the corresponding workflow action(s) can be initiated (and the options window 350 closed out) by a click on "SUBMIT" icon 360.

Reference is now made to FIG. 4. FIG. 4 illustrates another example user interface page 400 for the same application as described above. The column 310, the option reveal icons $320_1$ to $320_{11}$, and the tendency indicator icons $324_1$ to $324_{11}$ appear the same as illustrated and described in connection with FIG. 3.

As shown in the illustrated example, a user operates an input device (such as, for example, one of the input devices 114 shown in FIG. 1) to move the selector icon 330 over the option reveal icon $320_3$. The user then clicks on the option reveal icon $320_3$ to affect the display of options window 450.

Included within the options window 450 are additional person identification details 452 for the person having the last name "Abernethy" and determined bias score 454. Also included within the options window 350 are selectable options $458_1$ and $458_2$, each corresponding to a respective workflow action that might be appropriate in relation to an identified tendency of "Abernethy". Regarding the selectable options $458_1$ and $458_2$, the selectable option $458_1$ is selected (i.e. filled circle bullet) whereas the selectable option $458_2$ is not selected (i.e. open circle bullet). Once the user has completed the selecting (and/or the unselecting) of the selectable options $458_1$ and $458_2$, the corresponding workflow action(s) can be initiated (and the options window 450 closed out) by a click on "SUBMIT" icon 460.

Reference is now made to FIG. 5. FIG. 5 illustrates another example user interface page 500 for the same application as described above. The column 310, the option reveal icons $320_1$ to $320_{11}$, and the tendency indicator icons $324_1$ to $324_{11}$ appear the same as illustrated and described in connection with FIG. 3.

As shown in the illustrated example, a user operates an input device (such as, for example, one of the input devices 114 shown in FIG. 1) to move the selector icon 330 over the option reveal icon 320$_1$. The user then clicks on the option reveal icon 320$_1$ to affect the display of options window 550.

Included within the options window 550 are additional person identification details 552 for the person having the last name "Cortez" and determined bias score 554. Also included within the options window 550 are selectable options 558$_1$ to 558$_3$, each corresponding to a respective workflow action that might be appropriate in relation to an identified tendency of "Cortez". Regarding the selectable options 558$_1$ to 558$_3$, the selectable option 558$_1$ is selected (i.e. filled circle bullet) whereas the selectable options 558$_2$ and 558$_3$ are not selected (i.e. open circle bullets). Once the user has completed the selecting (and/or the unselecting) of the selectable options 558$_1$ to 558$_3$, the corresponding workflow action(s) can be initiated (and the options window 550 closed out) by a click on "SUBMIT" icon 560.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot dynamically generate one or more selectable workflow actions within a graphical user interface, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method carried out within a computer system, that includes a user-interactable dashboard, to facilitate employee bias management in public safety or private enterprise employment, the computer-implemented method comprising:
   establishing an incident database that includes a plurality of fields, the plurality of fields including:
      at least one first field corresponding to a rights-protected person class,
      at least one second field corresponding to an individual person identification or a people group identification, and
      at least one third field corresponding to additional data;
   obtaining incident data from the incident database, the incident data including data from the first field, the second field and the third field of the plurality of fields;
   providing the incident data to an at least one electronic processor to generate a plurality of tendency scores, calculated at least from operand data corresponding to the first field and the third field, for a respective plurality of items of the second field, wherein:
      first and second groups of the generated tendency scores are calculated to fall within first and second score ranges respectively, and
      a tendency threshold falls between end boundaries of the first and second score ranges; and
   displaying a plurality of selectable icons within a graphical user interface, each of the selectable icons corresponding to a respective one of a number of the items of the second field, and each of the selectable icons including an indication as to whether a tendency score for the respective item of the second field is within the first score range or alternatively is within the second score range;
   receiving input corresponding to a user having selected a first selectable icon of the plurality of selectable icons; and
   in response to the received input, dynamically generating at least one user-selectable option within the graphical user interface corresponding to at least one workflow action impacting an identified person or group of people corresponding to the first selectable icon,
   wherein:
      the at least one workflow action is related to an identified tendency of the identified person or group of people, and
      the at least one workflow action corresponds to one or more of the following:
   sending a tendency report to a supervisor of the identified person or group of people; sending the tendency report to a human resources person or department; requesting a meeting with the identified person or one or more representatives for the identified group of people; requesting corrective training curriculum for the identified person or group of people; initiating creation of a public relations bulletin; and sending an accomplishment notification to the human resources person or department.

2. The computer-implemented method as claimed in claim 1 wherein the rights-protected person class is race, color, gender or religion, and the identified person or group of people is one of a public safety officer and a prison guard, or one of a group of public safety officers or a group of prison guards respectively.

3. The computer-implemented method as claimed in claim 1 wherein the rights-protected person class is race, color, gender or religion, and the identified person or group of people is a private enterprise employee that interacts directly with customers, or a group of private enterprise employees that interact directly with customers.

4. The computer-implemented method as claimed in claim 1 wherein the graphical user interface includes the user-interactable dashboard, and the indication takes a form of one of: i) one color of a plurality of different colors; and ii) one shape of a plurality of different shapes, and the one color or the one shape is based on where the respective selectable icon falls within the first and second groups of the generated tendency scores.

5. The computer-implemented method as claimed in claim 1 wherein the third field of the plurality of fields corresponds to one of the following: incident type; incident location; category of vehicle in respect of a traffic stop; number of officer complaints for a particular rights-protected person class; and alleged basis for vehicle stop.

6. The computer-implemented method as claimed in claim 1 wherein the second group of the generated tendency scores is further subdivided into third and fourth groups of the generated tendency scores that are calculated to fall within third and fourth score ranges respectively, and an additional tendency threshold falls between end boundaries of the third and fourth score ranges.

7. The computer-implemented method as claimed in claim 6 wherein the at least one user-selectable option is a plurality of user-selectable options which vary depending upon whether both the tendency threshold and the additional tendency threshold are satisfied, or whether only the tendency threshold is satisfied.

8. The computer-implemented method as claimed in claim 1 further comprising applying a computer-implemented privacy policy to sensitive data within the incident database, the sensitive data including data for the second field.

9. The computer-implemented method as claimed in claim 8 wherein the data for the second field is not directly accessible to the user.

10. The computer-implemented method as claimed in claim 1 wherein the incident database stores at least one of incident audio metadata and incident video metadata.

11. A computer system configured to provide a user-interactable dashboard for facilitating employee bias management in public safety or private enterprise employment, the computer system comprising:
 a computer-readable medium having an incident database that includes a plurality of fields, the plurality of fields including:
  at least one first field corresponding to a rights-protected person class,
  at least one second field corresponding to an individual person identification or a people group identification, and
  at least one third field corresponding to additional data;
 an at least one electronic processor communicatively coupled to the computer-readable medium, and the at least one electronic processor being configured to:
  receive incident data including data from the first field, the second field and the third field of the plurality of fields; and
  generate a plurality of tendency scores, calculated at least from operand data corresponding to the first field and the third field, for a respective plurality of items of the second field, wherein:
   first and second groups of the generated tendency scores are calculated to fall within first and second score ranges respectively, and
   a tendency threshold falls between end boundaries of the first and second score ranges; and
 a computer terminal configured to:
  display a plurality of selectable icons within a graphical user interface provided on a display screen of the computer terminal, and each of the selectable icons: i) corresponding to a respective one of a number of the items of the second field, and ii) including an indication as to whether a tendency score for the respective item of the second field is within the first score range or alternatively is within the second score range;
  receive input corresponding to a user having selected a first selectable icon of the plurality of selectable icons; and
  in response to the received input, dynamically generate at least one user-selectable option within the graphical user interface corresponding to at least one workflow action impacting an identified person or group of people corresponding to the first selectable icon, and
 wherein:
  the at least one workflow action is related to an identified tendency of the identified person or group of people, and
  the at least one workflow action corresponds to one or more of the following: sending a tendency report to a supervisor of the identified person or group of people; sending the tendency report to a human resources person or department; requesting a meeting with the identified person or one or more representatives for the identified group of people; requesting corrective training curriculum for the identified person or group of people; initiating creation of a public relations bulletin; and sending an accomplishment notification to the human resources person or department.

12. The computer system as claimed in claim 11 wherein the rights-protected person class is race, color, gender or religion, and the identified person or group of people is one of a public safety officer and a prison guard, or one of a group of public safety officers or a group of prison guards respectively.

13. The computer system as claimed in claim 11 wherein the rights-protected person class is race, color, gender or religion, and the identified person or group of people is a private enterprise employee that interacts directly with customers, or a group of private enterprise employees that interact directly with customers.

14. The computer system as claimed in claim 11 wherein the third field of the plurality of fields corresponds to one of the following: incident type; incident location; category of vehicle in respect of a traffic stop; number of officer complaints for a particular rights-protected person class; and alleged basis for vehicle stop.

15. The computer system as claimed in claim 11 wherein the second group of the generated tendency scores is further subdivided into third and fourth groups of the generated tendency scores that are calculated to fall within third and fourth score ranges respectively, and an additional tendency threshold falls between end boundaries of the third and fourth score ranges.

16. The computer system as claimed in claim 15 wherein the at least one user-selectable option is a plurality of user-selectable options which vary depending upon whether both the tendency threshold and the additional tendency threshold are satisfied, or whether only the tendency threshold is satisfied.

17. The computer system as claimed in claim 11 wherein the incident database stores at least one of incident audio metadata and incident video metadata.

\* \* \* \* \*